United States Patent [19]

Barber et al.

[11] Patent Number: 4,509,716

[45] Date of Patent: Apr. 9, 1985

[54] ELECTROMAGNETICALLY OPERATED HYDRAULIC VALVE DEVICE WITH SNAP-TOGETHER VALVE HOUSING

[75] Inventors: Michael Barber, Toronto; Charles F. Lloyd, Rexdale, both of Canada

[73] Assignee: CTS Corporation, Elkhart, Ind.

[21] Appl. No.: 537,532

[22] Filed: Sep. 30, 1983

[51] Int. Cl.³ .................... F16K 31/02; H01F 7/00
[52] U.S. Cl. .................... 251/141; 251/129; 335/278; 335/262
[58] Field of Search ............ 251/129, 141, 138, 322, 251/333, 337; 335/262, 278; 137/625.65

[56] References Cited

U.S. PATENT DOCUMENTS

| 1,650,799 | 11/1927 | Lee | 335/262 |
|---|---|---|---|
| 2,415,739 | 2/1947 | Fuchs | 335/262 |
| 2,449,438 | 9/1948 | Wisegarver | 335/278 |
| 3,395,890 | 8/1968 | Eckert et al. | 251/333 |
| 3,661,183 | 5/1973 | Komaroff | 251/50 |
| 3,856,260 | 12/1974 | Giordano | 137/625.65 |
| 3,921,111 | 11/1975 | Kowalski | 335/262 |
| 4,233,584 | 11/1980 | Fussner | 335/278 |
| 4,439,751 | 3/1984 | Gibas | 335/278 |

FOREIGN PATENT DOCUMENTS 2713144 11/1977 Fed. Rep. of Germany ...... 335/262

*Primary Examiner*—Samuel Scott
*Assistant Examiner*—G. Anderson
*Attorney, Agent, or Firm*—Rodger H. Flagg

[57] ABSTRACT

The present invention comprises an electromagnetically operated hydraulic valve device (10) providing an almost instantaneously responsive displacement of a ball valve (60) in order to effect fluid flow relative thereto. Hydraulic valve device (10) comprises a generally cylindrical housing (12) having one end (16) open and a bushing (19) extending from the other end (18), with a plurality of longitudinal openings (14) disposed about the perimeter of housing (12). A cylindrical bobbin (30) having an interior through opening (32) is disposed within housing (12) and supports an electrical winding (34), with a core member (20) enclosing the open end (16) of the housing and having a circular post (22) extending into the bobbin opening (32). A nonmagnetizable sleeve (38) is located within the interior of bushing (19) between the bushing and a cylindrically shaped armature (36). One end (37) of the armature has an opening disposed opposite a complementary shaped opening (21) in the end of post (22), a spring (39) being received therebetween. An outer valve casing (40) is disposed over housing bushing (19), the outer valve casing having an interior cavity (45) with a groove (48) disposed in the wall of cavity (45). An inner valve casing (70) having a circumferential boss (74) about the perimeter of the casing is fitted within the interior cavity (45) by means of a leak resistant, snap-together engagement of the circumferential boss (74) and groove (48), and a glass ball valve (60) is captured within a subinterior cavity (75) in the inner valve casing. Ball valve (60) is held in sealing engagement with valve seat (45) by means of a free-floating drive pin (50), the other end of drive pin (50) abutting against armature (36). Energization of winding (34) effects an almost instantaneously responsive displacement of armature (36) whereby ball valve (60) is displaced and engages valve seat 72, relative to valve seat (45) and fluid flow effected thereby.

18 Claims, 4 Drawing Figures

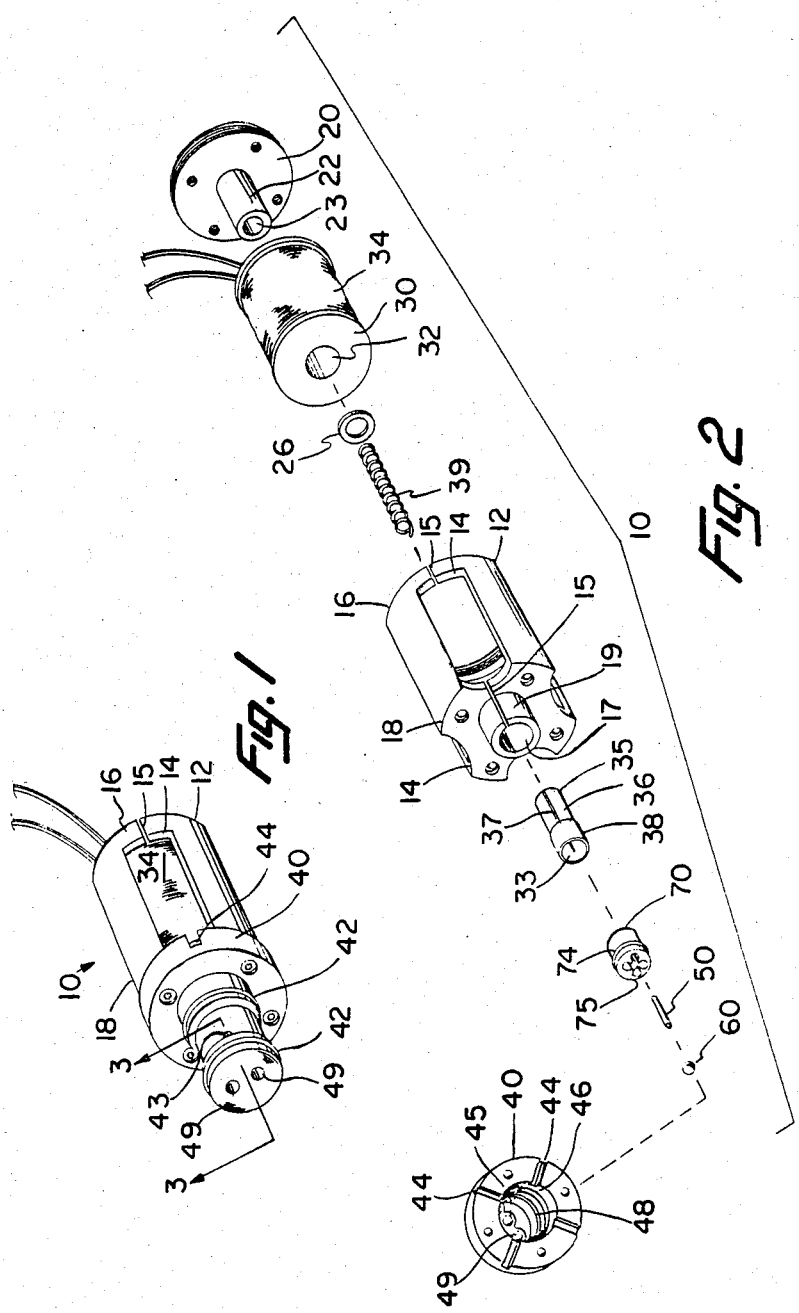

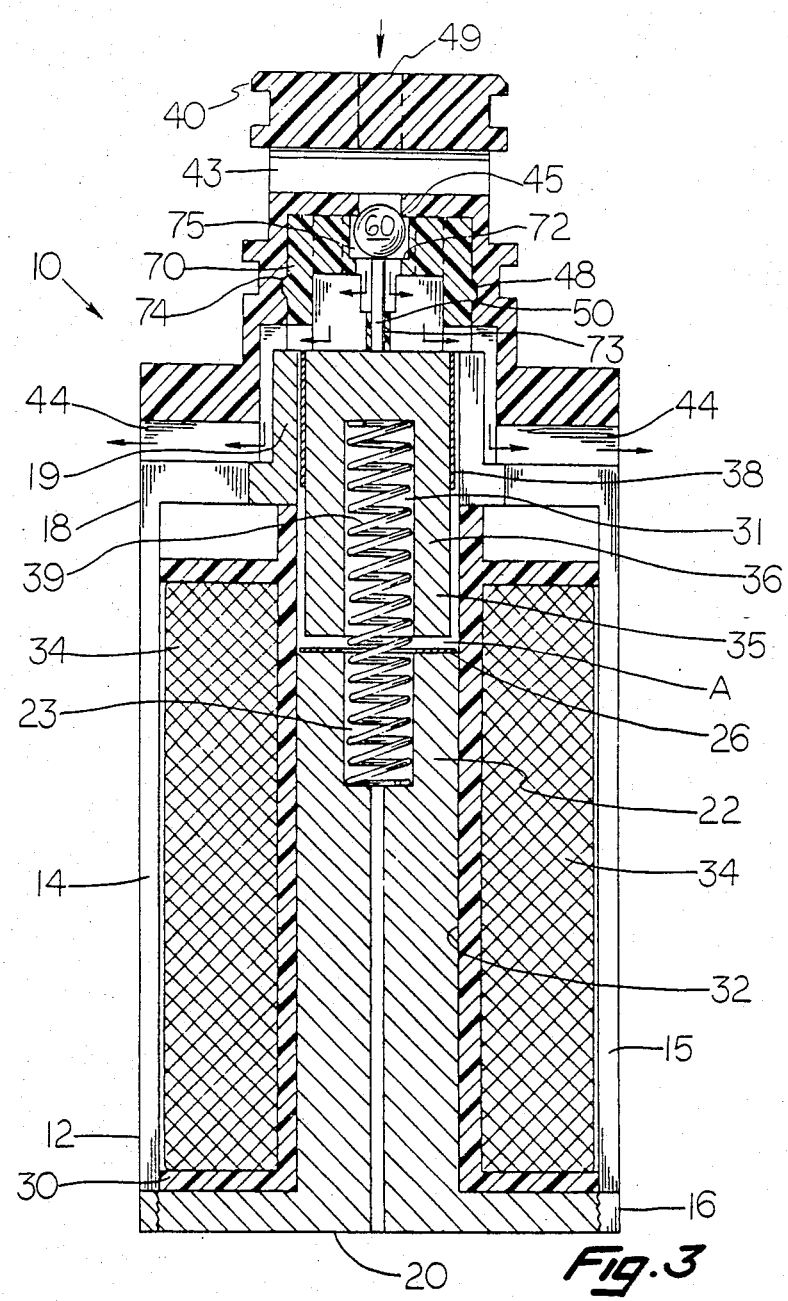

ELECTROMAGNETICALLY OPERATED HYDRAULIC VALVE DEVICE WITH SNAP-TOGETHER VALVE HOUSING

DESCRIPTION

1. Technical Field

This invention relates to the use of electromagnetically operated hydraulic valve devices.

2. Background Art

Solenoid operated hydraulic valves have been used for many applications. Bouvet et al. U.S. Pat. No. 4,320,781 issued Mar. 23, 1982 and entitled "Three-Way Electrically-Actuated Hydraulic Distributor" illustrates a solenoid operated hydraulic valve device utilizing a magnetic ball displaced by energization of the electromagnetic coil. Komaroff et al. U.S. Pat. No. 3,661,183 issued May 9, 1972 and entitled "Electromagnetically Operated Valve With Two Seats" describes a complex electromagnetically operated valve device which displaces an armature in order to move a ball valve from a valve seat. Eckert et al. U.S. Pat. No. 3,395,890 issued Aug. 6, 1968 and entitled "Plastic Control Valve and Method for Making Same" describes a solenoid operated hydraulic ball valve wherein the engagement of the ball valve with a thin outer layer of unfilled plastic effects a fluid tight engagement. Giordana U.S. Pat. No. 3,856,260 issued Dec. 24, 1974 and entitled "Three-Way Solenoid Valves" illustrates a solenoid valve device which, when energized, attracts the ball valve away from the valve seat.

These prior art patents disclose several variations of solenoid operated hydraulic valve mechanisms, which utilize generally a multiplicity of parts and interfitting mechanisms in order to provide a reliable solenoid valve.

With the advent of electronic automotive transmissions, there has been a need for a simple, highly reliable and fast operating electromagnetic hydraulic valve device for effecting fluid flow within the transmission. The hydraulic valve device must have an almost instantaneous response, must not leak transmission fluid, comprise as few parts as possible, and provide an inexpensive, easily assembled construction.

DISCLOSURE OF THE INVENTION

The present invention comprises an electromagnetically operated hydraulic valve device providing an almost instantaneously responsive displacement of the valve in order to effect fluid flow relative thereto. The hydraulic valve comprises a cylindrical housing having one end open and the other end enclosed with a bushing extending therefrom. The housing has a plurality of longitudinal openings for eliminating eddy currents. Located within the housing is a cylindrical bobbin supporting an electrical winding and having an interior through opening. A core member encloses the open end of the housing and has a circular post extending within the bobbin opening. A nonmagnetizable sleeve is located within the interior of the bushing in order to provide a constant cross section gap, and is attached to one end of a cylindrical armature, the other armature end having an opening therein and extending within the bobbin opening. The post has an opening which receives one end of a coil spring, the other end of the coil spring being received within the armature opening. An outer valve casing is secured over the housing bushing, the outer valve casing having an interior cavity with a groove disposed in the wall of the cavity. An inner valve casing having a circumferential boss about the perimeter of the casing is fitted within the interior cavity by means of a leak resistant, snap-together engagement of the circumferential boss and groove, and a glass ball valve captured within a subinterior cavity in the inner valve casing. The ball valve is held in sealing engagement with the outer valve casing valve seat by means of a free-floating drive pin, the other end of the drive pin abutting the armature. Energization of the winding effects an almost instantaneously responsive displacement of the armature whereby the ball valve is displaced relative to the valve seat and fluid flow effected thereby.

The electromagnetically operated hydraulic valve device of the present invention is designed to provide an almost instantaneous response. In order to overcome fluid flow forces and decrease response time, the device is designed to increase the initial displacement forces effected by energization of the coils. This is accomplished by providing a constant gap in the form of the nonmagnetizable sleeve disposed between the armature and the bushing. Additionally, the ball valve travels only a small distance so that the required displacement of the ball valve is accomplished during the maximum force portion of solenoid operation. The device provides a residual gap between the end of the core post and the armature, the residual gap being located within the interior of the windings, thereby preventing magnetic lock-up of the armature and post. The longitudinal slots or openings in the cylindrical housing break up and eliminate current flow which can form in the perimeter of the housing. This results in magnetic flux flow concentrating within the desired flow path through the winding, armature, core and housing, to assist in effecting the fast response time.

The glass ball valve seats tightly against the nylon valve seat of either the outer valve casing or the inner valve casing, to provide a leak resistant valve. Additionally, the free-floating pin is designed as a separate piece rather than an integral part of the armature, in order to compensate for the stack-up of manufacturing tolerances and to eliminate alignment problems.

The inner valve casing and outer valve casing have a snap-together interfitment which precludes leakage about the valve casings, and greatly simplifies assembly. The hydraulic valve device is easily assembled by the "drop-in" method of assembly whereby the ball valve is positioned between the inner and outer casings, the casings snap-fitted together, the free-floating drive pin inserted within the opening in the inner valve casing, the armature and coil spring placed within the bushing and the outer valve casing secured to the housing over the bushing, with the bobbin and core piece all previously inserted into the housing.

BRIEF DESCRIPTION OF THE DRAWINGS

FIG. 1 is an isometric view of the electromagnetically operated hydraulic valve device of the present invention;

FIG. 2 is an exploded view of the hydraulic valve device of FIG. 1;

FIG. 3 is a section view along line 3—3 of FIG. 1 and illustrating the valve device in the closed position.

BEST MODE FOR CARRYING OUT THE INVENTION

Figure 4:
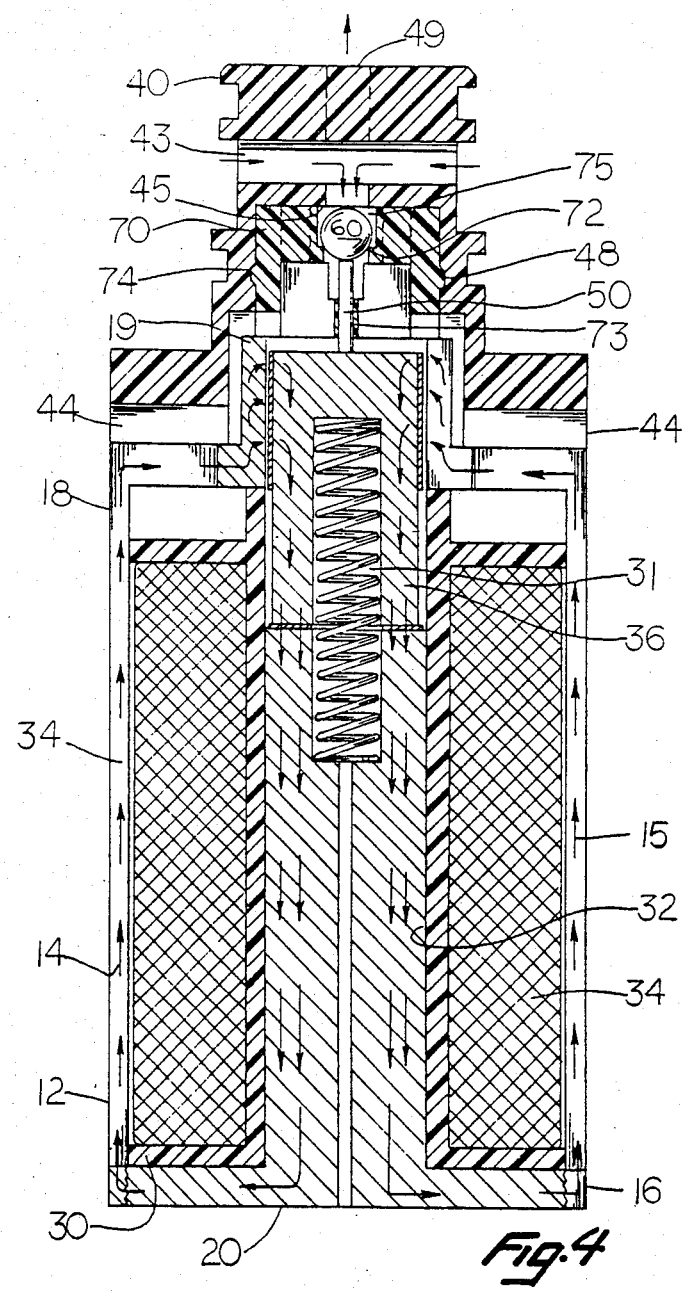
FIG. 4 is the section view of FIG. 3 and illustrating the valve device in the open position.

Referring to the drawings, particularly FIGS. 1 and 2, the electromagnetically operated hydraulic valve device is referenced generally by numeral 10. The valve device 10 comprises a cylindrical metallic housing 12 having a plurality of longitudinal openings 14 disposed about the perimeter of housing 12. End 16 of housing 12 is open and oppositely disposed end 18 has a cylindrical bushing 19 extending therefrom. Secured over bushing 19 and housing end 18, is an outer valve casing 40 including circular seals 42 and various fluid flow openings 43, 44 and 49. Core member 20 encloses open end 16 of housing 12, and has a cylindrical core post 22 extending into an interior opening 32 of a nonmagnetizable, nonconductive bobbin 30. Nonmagnetic washer 26 is disposed over the end of core post 22. Coil spring 39 is received in core opening 23 and complementary opening 31 in armature 36. Bobbin 30 supports an electrical winding 34, the bobbin 30 being located within housing 12. In opening 32 of bobbin 30 is one end 35 of a cylindrical metallic armature 36 having a nonmagnetizable brass sleeve 38 secured about the other end. Sleeve 38 can be attached either to end 33 of armature 36 or within opening 17 of bushing 19. Armature 36 includes a slot opening 37 which, in conjunction with housing slot opening 15, precludes eddy currents and fluid lockup of the valve device. The nonmagnetizable sleeve 38 and associated end 33 of armature 36 are positioned within opening 17 of bushing 19. Abutting armature 36 is a free-floating metallic drive pin 50 which engages, at its other end, a glass ball valve 60. Glass ball valve 60 is located within the subinterior cavity 75 of inner valve casing 70, cavity 75 enclosed by valve seat 72 of inner valve casing 70 and valve seat 45 of casing 40. Groove 48 is disposed about the wall of outer valve casing cavity 46, and receives the circumferential boss 74 of inner valve casing 70 in order to provide a snap-together engagement and securement of the valve casings. This provides a leak tight securement of the casings so that fluid does not leak through the casings during operation of the device.

Ball valve 60 is made of glass and provides a leak tight engagement with the nylon material of valve casings 40 and 70. Outer valve casing 40 provides valve seat 45 and inner valve casing 70 provides valve seat 72, which when engaged by glass ball valve 60, do not allow any fluid to leak through the respective valve seat.

Free-floating metallic drive pin 50 eliminates alignment problems between the armature 36 and the glass ball valve 60. Because pin 50 is not attached to or an integral part of armature 36, there is compensation for manufacturing tolerance variations and no problems in aligning the pin with ball valve 60.

Inner valve casing 70 is made of a nylon material and provides an easily assembled, snap-together fitting with outer valve casing 40. The snap-together fitting has proved to be leak proof and, in conjunction with the leak proof engagement of the glass ball valve 60 with valve seats 45 and 72, prevents any fluid from leaking through the hydraulic valve portion of the electromagnetic valve device. It is very important that fluid does not leak through the valve portion of the device because such leakage could reduce the fluid flow and pressures in the apparatus to which the valve device is attached.

In order to provide an almost instantaneously responsive electromagnetic hydraulic valve device, the device of the present invention effects the maximum force possible during displacement of the armature. In order to utilize the maximum force that occurs during operation of the solenoid, the device uses only a very small operative displacement of the ball valve to accomplish the required operation of the valve.

Referring to FIG. 3 which is a section view of the hydraulic valve device, the nonmagnetic sleeve 38 provides a constant cross section gap between armature 36 and bushing 19. This concentrates flux flow in this area and increases the forces acting upon the armature. There is a gap A, which includes the residual gap provided by washer 26, located between end 35 of armature 36 and the end of the core post 22, the gap being circumposed by winding 34. The inductance is affected by the flux flow at critical areas of the electromagnetic device 10. Gap A provides inductance thereacross and allows movement of the armature towards the post. The arrows in the housing, winding, bushing, armature and core (FIG. 4) illustrate the flux flow path. The cumulative areas of the bushing, sleeve, and end 35 of armature 36 are greater than gap area A between the ends of armature 36 and post 22 in order to concentrate flux flow thereat and effect a high speed, fast response that overcomes fluid flow forces.

In order to increase the response time of the electromagnetic device, current flows through the path of least resistance, which could include the circular paths within the cylindrical housing. In order to eliminate this circular flow of eddy currents, longitudinal openings 14 and slot 15 have been located within the housing 12. The openings 14 and slot 15 eliminate eddy currents and provide a route for flux flow as illustrated in FIG. 4. However, it is important that openings 14 do not cumulatively comprise an area so large that the area of housing 12 is less than the combined area of the armature and coil. In other words, the total area of the metal housing 12 should be at least equal to or greater than the combined area of the core and armature, this relationship providing a concentration of flux lines and contributing to effecting a fast response time.

FIG. 3 illustrates the electromagnetic hydraulic valve device 10 with the ball valve 60 engaging the valve seat 45 in the closed position which prevents fluid from flowing through port 43 into subinterior cavity 75. Fluid flows through ports 49 into subinterior cavity 75 and outwardly through ports 44. FIG. 4 illustrates valve device 10 in the retracted position, after energization of the windings 34, with valve 60 engaging valve seat 72. Energization of windings 34 provides a flux flow as illustrated by the arrows, which results in a high speed displacement of armature 36 towards core post 22. This high speed response permits a correspondingly quick retraction of drive pin 50 which allows ball valve 60 to unseat from valve seat 45 and engage valve seat 72, whereby fluid flows through port 43 into subinterior cavity 75 and then outwardly through ports 49.

ASSEMBLY AND OPERATION

The electromagnetically operated hydraulic valve device 10 is easily assembled and operated. Windings 34 are disposed on bobbin 30, the bobbin inserted into housing 12, and metallic core 20 threadedly inserted into open end 16 of housing 12. Inner valve casing 70 receives the glass ball valve 60 within subinterior cavity 75, and casing 70 placed within cavity 46 and snap-fitted into engagement with casing 40. Drive pin 50 is inserted within opening 73 of inner valve casing 70, and armature 36 and coil spring 39 inserted within bushing 19. Then outer valve casing 40 is secured over bushing 19 and to housing end 18.

Upon energization of coil winding 34, the flux flow paths illustrated in FIG. 4 are effected and cause a high speed retraction of armature 36 towards post 20. Fluid pressure exerted upon ball valve 60 forces it out of engagement with valve seat 45 as drive pin 50 moves with armature 36, and into engagement with valve seat 72. It should be clearly understood that the design of the hydraulic valve portion of the device is a matter of design choice. Subinterior cavity 75 can be located in either the inner or outer valve casings. The valve device may be designed so that ball valve 60 is in a normally open position whereby retraction of armature 36 displaces drive pin 50 against ball valve 60 to engage valve seat 45 and effect closure of the valve. The flow directions of the valve seats and ports are all a matter of design choice for the particular application, and such design variations of the valve device are not, per se, part of the present invention, but well within the various design modifications of the device.

The electromagnetically operated hydraulic valve device is assembled from a minimum number of parts to provide a leak resistant hydraulic valve device with an almost instantaneous response. The electromagnetic valve device utilizes the maximum force available at initial energization for operation of the hydraulic valve whereby the fluid flow pressure can be easily overcome and a high speed response provided.

INDUSTRIAL APPLICABILITY

The electromagnetically operated hydraulic valve device may be utilized with automotive transmissions.

CONCLUSION

Although the present invention has been illustrated and described in connection with an example embodiment, it will be understood that this is illustrative of the invention, and it is by no means restrictive thereof. It is reasonably to be expected that those skilled in the art can make numerous revisions and additions to the invention and it is intended that such revisions and additions will be included within the scope of the following claims as equivalents of the invention.

We claim:

1. A fast response electromagnetic hydraulic valve device, comprising a housing having a plurality of longitudinal openings disposed therein and a bushing disposed at one end thereof, a core providing end closure means for an end of said housing oppositely disposed from said bushing, said core including a longitudinal core post projecting inwardly of said housing and having an opening in said post, a bobbin having a central opening therein receiving said post, winding means supported by said bobbin and circumposing said core post, an armature movable longitudinally within said housing with one end received in the central opening of said bobbin and the other end disposed within the bushing, the one end of the armature having an opening disposed opposite the post opening, resilient means received by the post and armature openings, sleeve means disposed between said bushing and the other end of the armature and providing a constant cross section nonmagnetizable gap between said armature and bushing, an outer valve casing secured over said bushing and having an interior cavity with a circumferential groove disposed about the cavity, an inner valve casing disposed within said interior cavity and a circumferential boss received by said circumferential groove to provide a snap-together engagement of the valve casings, a valve cavity disposed between the inner and outer valve casings, a valve member disposed within the valve cavity, and a free-floating drive pin engaging said valve member and the armature, whereby said winding means is energizable to effect almost instantaneous displacement of said armature and associated drive pin.

2. The valve device in accordance with claim 1, further comprising slot means disposed in said armature and housing in order to prevent fluid lock-up.

3. The valve device in accordance with claim 1, wherein said sleeve means is force fitted about an end of said armature and moves therewith relative to said bushing.

4. The valve device in accordance with claim 1, further comprising seal means disposed about the exterior of said outer valve casing for providing a seal between said hydraulic valve device and an opening in a transmission apparatus.

5. The valve device in accordance with claim 1, wherein said resilient means comprises a spring with a predetermined response rate for effecting said response.

6. The valve device in accordance with claim 1, wherein energization of said winding effects retraction of said armature towards said post.

7. The valve device in accordance with claim 1, further comprising a gap between said armature and post, and circumposed by said winding.

8. The valve device in accordance with claim 1, wherein the cumulative confronting areas of the bushing, sleeve and other end of said armature are substantially larger than the area between the one end of said armature and post, in order to effect a fast response time.

9. The valve device in accordance with claim 1, wherein said longitudinal openings in said housing are of sufficient size to substantially eliminate eddy currents.

10. A process for providing almost instantaneously responsive operation of a hydraulic valve by means of an electromagnetic hydraulic valve device, said device comprising a housing having disposed therein a bobbin supporting winding means and with a centrally disposed opening in said bobbin, a core member enclosing an end of said housing and having a post projecting longitudinally into said bobbin opening, an armature having one end received in the bobbin opening and the other end received within a housing bushing, and inner and outer valve casings at an end of the housing and about said bushing, comprising the steps of (a) disposing resilient means between said post and armature, (b) placing a ball valve member within valve cavity means disposed between said inner and outer valve casing, (d) fixing said inner valve casing within a cavity of said outer casing by engaging a peripheral boss about said inner valve casing with a complementary shaped groove disposed about said cavity to provide an interlocking, leak resistant securement of said inner and outer valve casings whereby said ball valve member is captured therebetween, (d) and securing said outer valve casing to said housing with a drive pin member positioned between said ball valve member and the armature whereby energization of said winding means effects substantially instantaneous displacement of said armature to effect movement of said ball valve member relative to said valve cavity means.

11. The process in accordance with claim 10, further comprising the step of providing nonmagnetic sleeve means about the other end of said armature whereby said sleeve means moves with said armature relative to said bushing.

12. The process in accordance with claim 10, wherein said step of energizing the winding means effects retraction of said armature towards said post.

13. The process in accordance with claim 10, further comprising the step of providing a valve device with the cumulative confronting areas of the bushing, sleeve and other end of said armature being substantially larger than the area between the one end of said armature and the post.

14. The process in accordance with claim 10, further comprising the step of providing longitudinal openings in said housing in order to substantially eliminate the effects of eddy currents.

15. The process in accordance with claim 10, further comprising the step of providing longitudinal opening means in said armature in order to substantially eliminate eddy currents and preclude fluid lock-up.

16. A high speed electromagnetic hydraulic valve device, comprising a generally cylindrical housing having a bushing disposed at one end thereof, a core including a longitudinal core post projecting inwardly of said housing, a bobbin having a central opening therein receiving said post, winding means supported by said bobbin and circumposing said core post, and armature movable longitudinally within said housing and one end of said armature disposed opposite the post, resilient means disposed between said post and said armature, sleeve means disposed between said armature and said housing in order to provide a constant cross section nonmagnetizable gap, an outer valve casing secured to said housing and having an interior cavity with a circumferential groove disposed about the interior cavity, an inner valve casing disposed within said interior cavity and having a circumferential boss received by said circumferential groove to provide a leak resistant, snap-together engagement of the valve casings, a valve cavity disposed between the inner and outer valve casings, a valve member disposed within the valve cavity, and a free-floating drive pin located between said valve member and the armature, whereby said winding means is energizable to effect almost instantaneous displacement of said armature and associated drive pin.

17. The hydraulic valve device in accordance with claim 16, further comprising slot means disposed in said armature and housing in order to prevent fluid lock-up.

18. The hydraulic valve device in accordance with claim 16, further comprising slot means disposed in said armature and housing in order to substantially eliminate eddy currents.

* * * * *